Oct. 31, 1972  D. J. JOHNSON  3,701,615

TIRE VULCANIZING MACHINE

Filed April 6, 1971

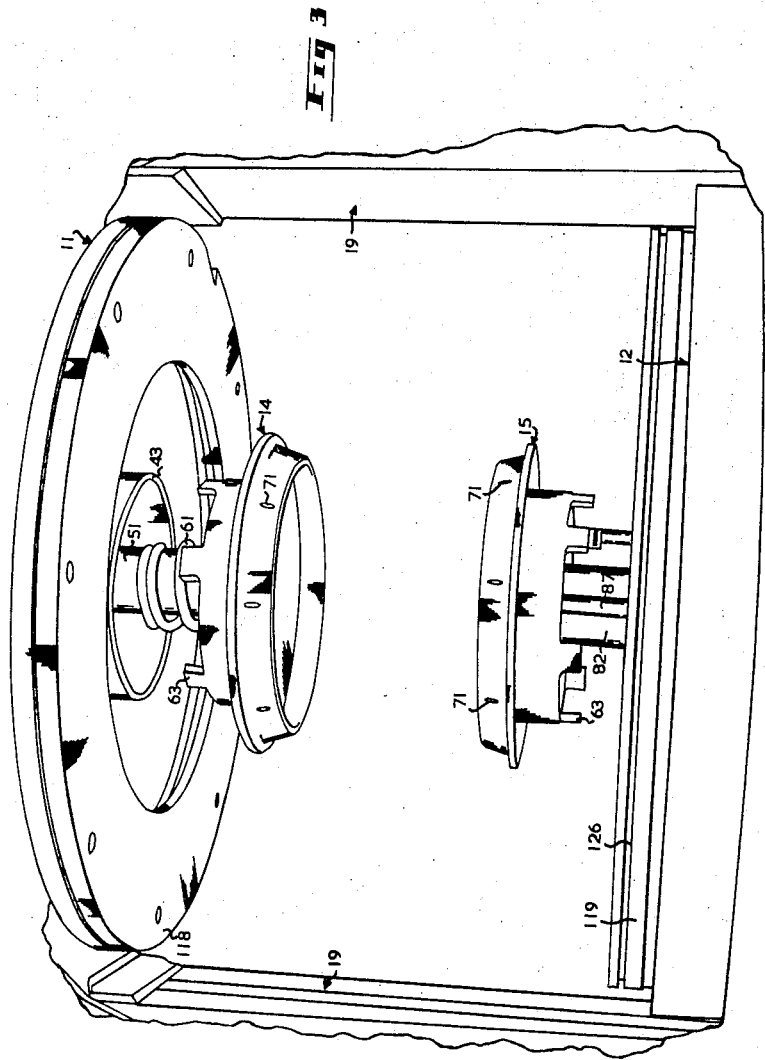

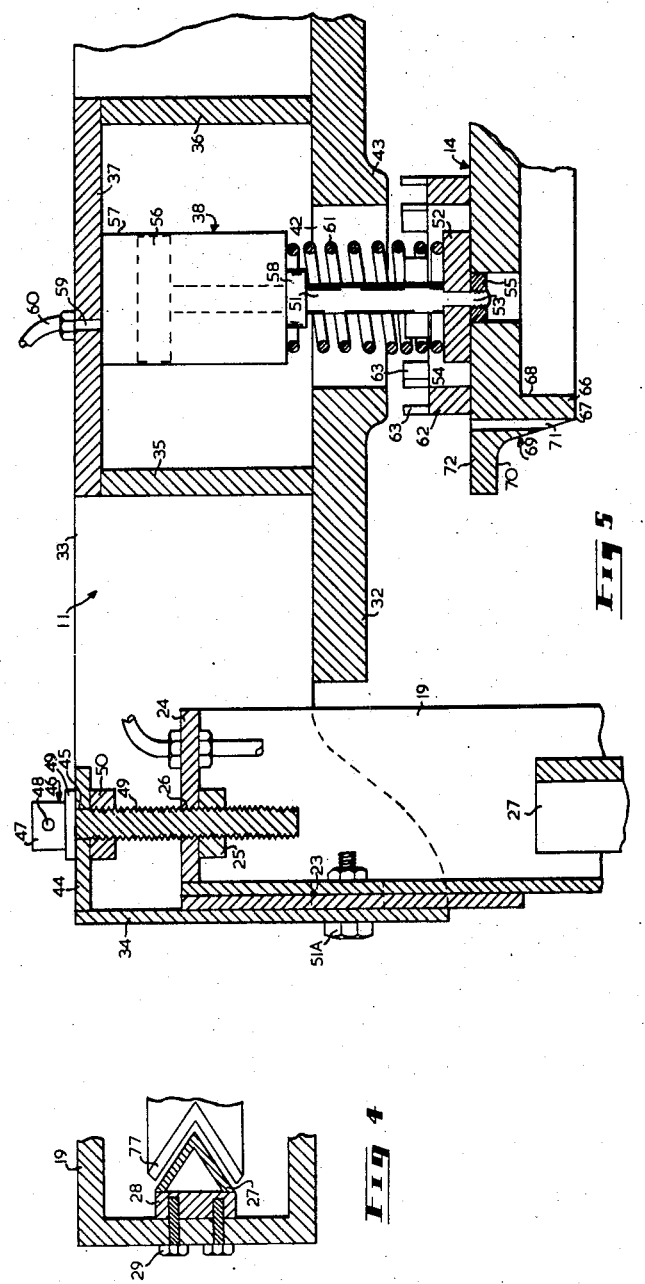

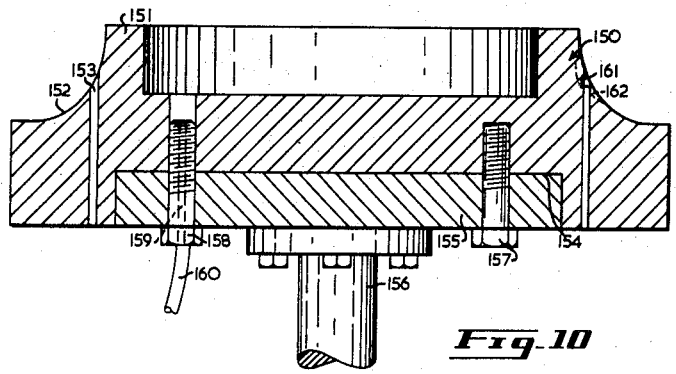
Fig. 8
Fig. 9
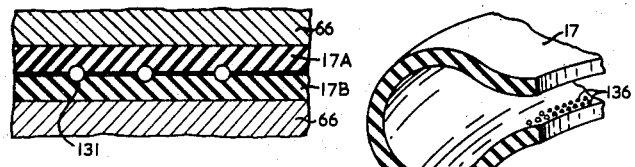
Fig. 10
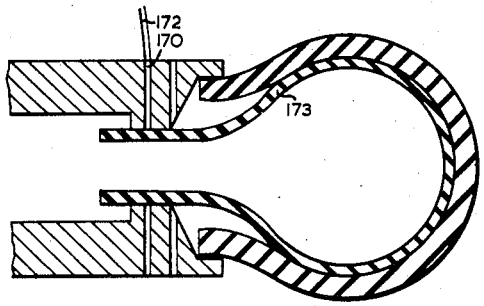
Fig. 11

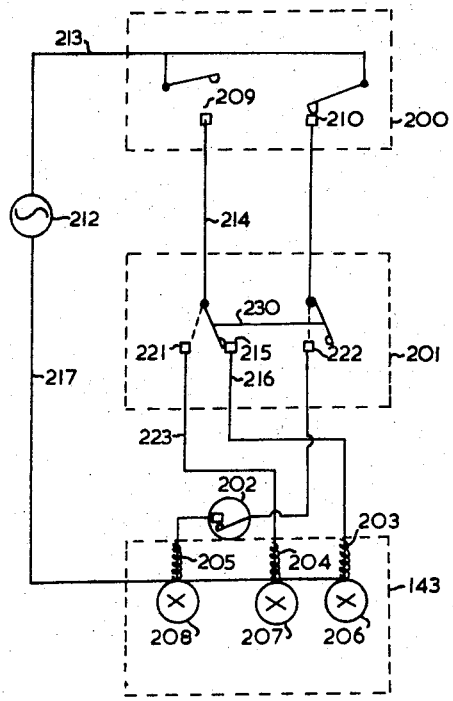
Fig 12
Fig 14
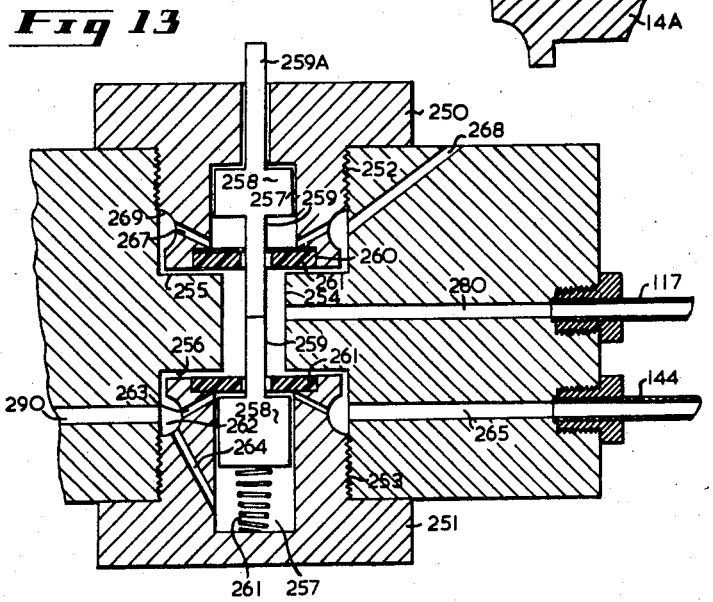
Fig 13

United States Patent Office 3,701,615
Patented Oct. 31, 1972

3,701,615
TIRE VULCANIZING MACHINE
David John Johnson, Amherst, Nova Scotia, Canada, assignor to M. Holmes Manufacturing & Equipment Ltd., Halifax, Nova Scotia, Canada
Filed Apr. 6, 1971, Ser. No. 131,603
Claims priority, application Canada, May 29, 1970, 84,110
Int. Cl. B29h 5/04
U.S. Cl. 425—23                                11 Claims

ABSTRACT OF THE DISCLOSURE

A device for treating pneumatic tires includes a pair of relatively moveable mold sections and a means to open, close and lock the sections in a closed position. A tire-inflating mechanism is also included comprising a flexible tire insert and a pair of relatively moveable plates, the plates and insert definings a sealed chamber, said plates having means to release air trapped between the plates and the tire-inflating means.

---

This invention relates to treating pneumatic tires and in the preferred form is directed particularly to recapping or retreading pneumatic tires. Specifically, the invention is directed to the mold actuating toggle system for opening and closing the device.

The term treating is intended to include retreading, recapping, curing, etc. (which normally includes vulcanizing) of pneumatic tires. A common feature to all such operations is that the tire is supported in a mold and inflated internally whereby the external surface of the tire presses tightly against the mold.

There are two important aspects to the present invention which are as follows:

(a) A tire inflating means in a tire treating apparatus, such means including a, C shape in cross-section, flexible tire insert or bladder and a pair of relatively movable plates, the combination of the plates and insert defining a sealed chamber whereby the tire may be inflated to the desired pressure, and (b) A mold supporting means in an apparatus employing a pair of relatively movable mold sections and including toggle means of novel construction to open, to close and to lock said mold in a closed position.

In the past, numerous attempts have been made to eliminate the usual inflatable tube used internally in the tire being treated. Some of these attempts have been directed to entirely eliminating the tube insert and utilizing a pair of pressure plates in contact with opposite beads of the tire. In such structure, the tire and the plate define an inflatable air chamber, however, difficulties have been encountered in obtaining an airtight seal between the plate and the tire bead. This is an obvious drawback, and in order to overcome it, it has been proposed to use a C shape in cross-section liner or bladder. These bladders have not been particularly successful and it will be noted in most instances that the bladder includes a channel shaped lip which engages the bead of the tire. This has not overcome the difficulties of obtaining an airtight seal. Furthermore, it is difficult to install and time consuming to fit the lips to the beads of the tire.

It is an object of the present invention to provide a C shaped cross section bladder in combination with a pair of relatively movable pressure plates to provide a relatively airtight chamber between such plates, whereby a tire can be inflated.

A further object is to provide a bladder for such use as described above and which does not require fitting on to the bead of the tire.

It is a further object to provide such a bladder and pressure plate, wherein the legs of the bladder extend beyond the beads of the tire to over-lap the junction between the respective plate and bead, to thereby provide a seal.

In accordance with the second aspect of the invention described above, it is a further object of this invention to provide an apparatus to support a pair of mold sections and including novel toggle means whereby such sections are relatively movable with respect to one another.

A further object is to provide an apparatus whereby the mold sections are automatically locked in a mold "closed" position.

A still further object of the present invention is to provide a tire recapping apparatus which is substantially automatic in operation.

The above disadvantages are overcome and objects obtained in an apparatus constructed in accordance with the present invention. Accordingly, one aspect of the invention consists of the tire recapping apparatus having a pair of oppositely disposed relatively movable pressure plates, each of said plates having an annular rib adjacent the marginal edge thereof spaced inwardly therefrom thereby to define a circumferential channel adapted to receive a bead of the tire, and a C shaped in cross-section flexible bladder having air impervious portions adapted to overlie the junction between the respective plates and the tire beads, said plates together with said bladder thereby defining a substantially airtight chamber.

One of the problems of the known retreading devices is to obtain a sufficiently large mold opening to easily place a tire therein while at the same time keeping the operative range of the actuating means (usually a fluid cylinder) to a minimum whereby the height of the overall machine does not reach unreasonable proportions. This may be termed the mold opening to cylinder movement ratio. This ratio has been substantially less than 1.00:1 according to the prior art. For example, the toggle arrangement shown in the United States patent to Corson, No. 2,624,-915 of Jan. 13, 1953, FIGS. 4 and 5 provided a piston or cylinder movement of approximately 14 inches with a mold or press opening of approximately 11½ inches, a ratio of .81:1.

In contrast, the toggle system according to the present invention provides an operating ratio of from 1.06:1 to 2.00:1. Accordingly, the present invention provides a toggle arrangement which allows the mold to open much farther than the distance travelled by the piston or cylinder.

A further aspect of the present invention therefore consists of a molding apparatus comprising a frame, a first member secured to said frame and adapted to support a first mold section, and a second member slidably mounted on said frame and guided along a predetermined path, said second member being adapted to support a second mold section, and toggle means to slidably move said second member whereby said mold sections are relatively movable with respect to one another to a mold "open" and "closed" position, said means comprising at least a pair of spaced toggles, each consisting of a pair of pivotally interconnected levers, said toggles being pivotally connected at opposite ends thereof respectively to said second member and said frame, a pneumatic cylinder having one member thereof secured to said second member and the other member of said cylinder pivotally connected to the respective toggles by a pair of levers, said levers being pivotally secured at one end thereof to the cylinder and at the other end to the respective toggles, said second member thereby being movable with respect to said first member upon actuation of said cylinder.

The invention is illustrated by way of example in the accompanying drawings wherein:

FIG. 3 is a detailed elevational view illustrating the mold sections respective supporting members with the mold sections removed to more clearly illustrate a pair of relatively movable tire bead engaging pressure plates;

FIG. 4 is a partial sectional view along section 4—4 of FIG. 2;

FIG. 5 is a partial sectional view along section 5—5 of FIG. 1;

FIG. 8 is a partial sectional view of the lips of the C shaped bladder member in a "pressed-together" position;

FIG. 9 illustrates a modified liner;

FIG. 10 illustrates a modified detachable pressure plate;

FIG. 11 illustrates a further modified pressure plate;

FIG. 12 is a schematic diagram of the electrical control system;

FIG. 13 is a partial, detailed cross sectional view of an air valve utilized in the control system; and FIG. 14 is a partial sectional view illustrating an adjustable abutment for the movable plates;

Figure 1:
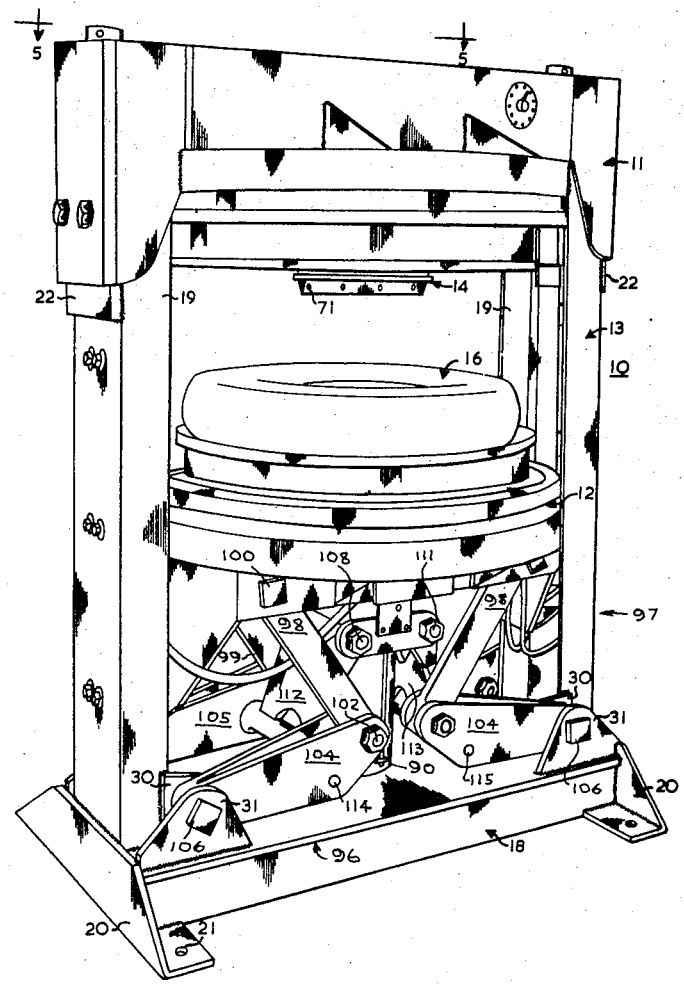
FIG. 1 is an oblique view of a tire recapping apparatus, the mold sections being in an "open" position.
Figure 2:
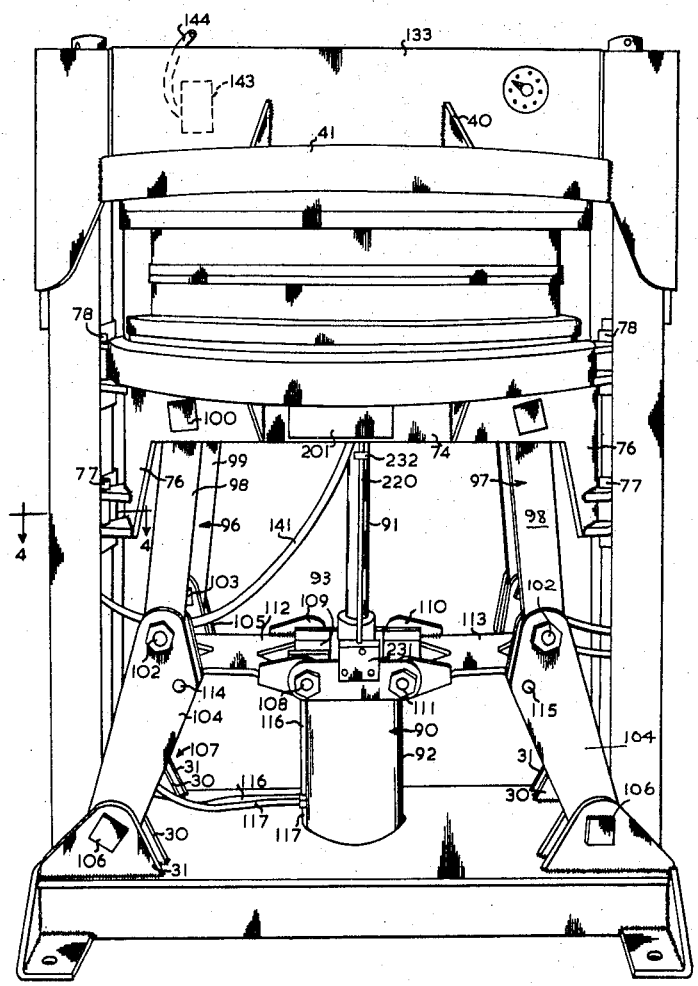
FIG. 2 is a similar view to FIG. 1 but illustrating the mold in a "closed" position.
Figure 15:
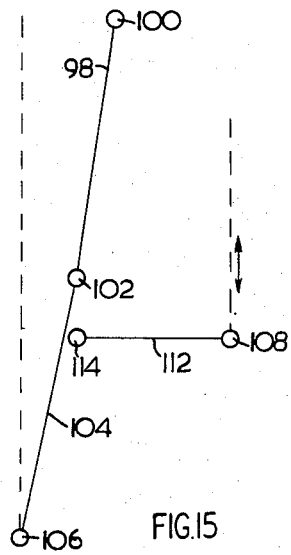
Figure 16:
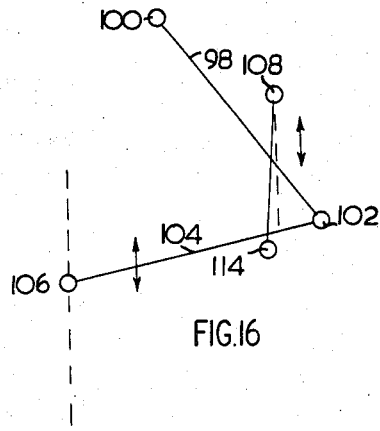
Figure 17:
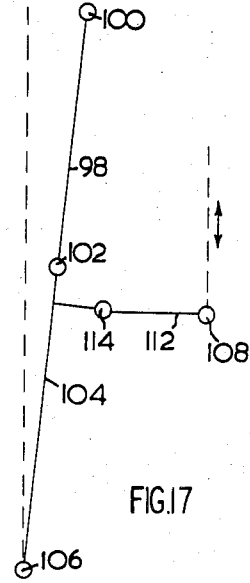

FIGS. 15 and 16 schematically illustrate the toggle arrangement of FIGS. 1 and 2 in closed and open positions respectively; and FIG. 17 is a schematic illustration of a modified version of the arrangements in FIGS. 15 and 16.

GENERAL ARRANGEMENT

Referring now to the drawings, shown in FIG. 1 is a tire recapping apparatus 10, consisting of separate mold supporting members 11 and 12 secured to a frame 13. The supporting member 12 is relatively movable with respect to the frame and thereby permits relative movement of the mold sections to a mold "open" and mold "closed" position. As will be seen hereinafter, and described in more detail, support 11 is manually adjustable with respect to the frame. It will be realized that this is not necessary for the operation of the machine. However, such adjustment permits compensation for wear which may occur through continued use. It also permits adjustment to compensate for slight differences in dimensions of molds made by different manufacturers since the present apparatus has been designed to accommodate molds made by various manufacturers.

A novel toggle means is employed to move the mold support member 12. This means is shown and described with respect to a tire recapping apparatus but it will be readily apparent that this operating means may also be utilized in other molding apparatus employing a pair of relatively movable mold sections.

An important aspect of the invention, as mentioned previously, is the utilization of relatively movable pressure plates adapted to contact the bead of a tire and including an open liner to overlie the junction of the plates and respective tire beads.

Referring to FIG. 3, associated respectively with mold support members 11 and 12 are pressure plates 14 and 15. Each pressure plate is relatively movable with respect to its respective mold supporting member to which it is attached. The plates further are resiliently biased outwardly from their respective supports in a manner to be described in more detail hereinafter.

The plates 14 and 15 engage opposite beads of a tire 16 which is to be recapped or otherwise treated in a closed mold and these plates are adapted to bear against opposite outer faces of the legs of a C-shaped, in cross-section, bladder 17 which is inserted into the tire.

The liner 17 is placed in the tire to be recapped and the assembly thereafter placed with the bead of the tire in a channel on the lower plate 15. The plates are then brought toward one another. The legs of the liner project inwardly beyond the beads of the tire and bear against a flange on the respective pressure plates. Air is introduced into the chamber between the plates after the mold sections have been closed; the plates together with the bladder form a sealed air chamber whereby the tire can be inflated to the desired pressure.

Frame structure

Referring now in detail to the drawings, the frame 10 consists of a base 18 having a pair of spaced upstanding parallel legs 19 rigidly secured thereto. The base includes a pair of spaced parallel angle members 20, adjacent each end thereof, that add stability to the device and they may also include apertures 21 to facilitate securing the base to a foundation.

Each leg 19 consists of a channel shaped structural member having a reinforcing bearing plate 22 secured thereto adjacent the upper end thereof. As shown in FIG. 5, the plate and the web of the channel are slotted as at 23 to receive bolts to thereby secure the upper mold support 11 at various desired adjustments. As previously mentioned, this adjustment compensates for wear and for various sized molds. The upper end of each leg includes a cap piece 24 having a nut 25 secured thereto in alignment with a threaded aperture 26 in the plate. An angle member 27 (FIG. 4) is secured to the web of the channel of each leg 19 by a plurality of blocks 28 and studs 29. The blocks each have threaded apertures adapted to receive the threaded studs. The blocks are secured to the legs of the angle member as by welding or other suitable means. The angle members extend throughout a portion of the length of the respective legs 19 and the angle member of one leg 19 has the apex thereof directed towards the other leg 19 of the frame. The angle member and the channel, to which it is attached, are in axial alignment and are axially parallel to that of the opposed leg. Referring to FIG. 1, secured to the base and each leg 19, on opposite sides thereof, is an apertured lug 30. A further apertured lug 31 is secured to the base adjacent each lug 30 but spaced therefrom. The apertures of the pair of lugs 30 and 31 are in axial alignment and provide means whereby a plurality of levers may be secured to the base of the frame. In the preferred embodiment of the invention a set of lugs consisting of pair of lugs 30 and 31 adjacent the opposite faces of each leg have the apertures thereof in axial alignment.

Upper mold support

FIG. 5 shows that the mold support 11 consists of a frame header slidably secured to the legs 19 adjacent the upper ends thereof. The header consists of a pair of spaced parallel plates 33 having a circular rigid plate 32 secured thereto and suspended therebelow. The plates 33 are secured together at opposite ends by channel members 34 adapted to slide on the outer surface of the legs 19. The plates 33 are interconnected and reinforced adjacent the central portion thereof by a pair of rigid vertically disposed plates 35 and 36 and a horizontally disposed plate 37. These plates, together with a portion of the plates 33 form a box adapted to receive a pneumatic cylinder 38 to which pressure plate 14 is attached.

The rigid plate 32, which is suspended from the plates 33, is also secured to the plates 35 and 36 and is further reinforced by a plurality of braces 40 and a circumferential rigid bar member 41. The plate 32 includes a central aperture 42 and adjacent the edge thereof is a reinforcing rib 43. The plates 33 are further interconnected at the upper edge thereof adjacent the outer opposite ends by members 44. These members also serve as a cap for the channels 34 and have therein an aperture 45 through which a threaded bolt 46 passes. The bolt consists of a head portion 47 having a tool inserting transverse aperture 48 therein, a flange 49 adapted to bear against the member 44 and a threaded stem 49 threaded into a nut 25. A nut 50 is secured to the stem to rotate therewith and bears against the lower face of the member 44. The bolt is thereby journalled in the cross head and threaded into the respective legs 19 to permit relative manual adjustment of the cross head with respect to the frame. The cross head may thus be adjusted to a desired position and locked in such position by means of a plurality of bolt and nut assemblies 51A. The bolt of the assemblies pass through the slots 23, in the respective legs 19 and suitably aligned apertures in the web of channels 34.

As mentioned previously, the plate 14 is movable relative to the supporting member 11. Such movement is accomplished through the pneumatic device 38 that consists of a piston shaft 9 secured to a piston 56 adapted to slide in a sleeve 57. The shaft is guided by a collar 58 secured to one end of the sleeve, to thereby also close such end and the opposite end of the sleeve is secured to the plate 37, the latter forming the bottom of the cylinder. An air pressure supply hose 60 is connected to the plate 37 and through an aperture 59 provides means whereby air pressure may be supplied to actuate the cylinder. The shaft is biased to a normally fully extended position by a coil spring 61. The purpose of this is to facilitate entry of air into the liner by pressing the legs of the liner between the pair of plates upon closing of the mold.

The plate 14 is secured either detachably or permanently to the piston shaft 9 of the pneumatic device. It is preferably detachably secured since one pressure plate will accommodate only one size of tire, that is a 14", 15", 16" etc. size of wheel. One means of mounting the plate to the shaft is shown in FIG. 5. As shown therein an apertured collar 52 is secured to the rear face of the plate and the shaft. The shaft 51 has an end portion 53 of reduced diameter thereby presenting a shoulder 54 adapted to abut against the collar 52. The shaft end portion 53 is threaded adjacent its outer end to receive a nut 55 and thereby secure the plate to the shaft. The plate 14 includes an annular reinforcing rib 62 on the rear face thereof to which lugs 63 are attached. These lugs are in alignment with, and abut against, the rib 43 of the plate 32. In a modified form these lugs may be made adjustable and consist of a plurality of studs 64 threaded into the rib 62A of the plate 14A as shown in FIG. 14. These studs may be readily locked in any desired position by lock nut 65 or other sutiable means.

Pressure plate construction

The opposite or front face of the plate 14 has an annular rib 66 projecting therefrom. The rib 66 has a flat outer edge 67 bounded on opposite edges by rib walls 68 and 69. The wall 69 preferably tapers outwardly in a direction toward the marginal edge of the plate 14 from the ribs edge 67. The wall 69 merges into the face 70 of the marginal flange about the plate. The face 70, together with the wall 69, defines a channel adapted to receive therein a bead of the tire. The perpendicular distance between the faces 67 and 70 is preferably equal to or greater than the thickness of the tire bead, such thickness being taken parallel to the axis of the tire. The purpose of this will become more apparent hereinafter.

A plurality of apertures 71 pass through each of the plates 14 and 15; each aperture extending from the surface of wall 69 adjacent the edge 67, to the back face 72 of the plate. From FIGS. 1 and 3 it will be readily apparent that the apertures are arranged radially about the plate, and the purpose of such apertures is to permit the air trapped between the liner, the tire bead and the channel in the plate, to be exhausted to atmosphere. These apertures are an important aspect of the present invention and are considered important to the successful, efficient performance of the apparatus.

Lower mold support

The lower mold support 12 is slidably mounted on a frame so as to move relatively with respect to the upper mold 11. The mold support 12 consists of a circular plate 73 supported upon a pair of spaced parallel plates 74 and 75 (not shown). These plates are interconnected at opposite ends by a further pair of plates 76 that extend downwardly as shown in FIG. 1. Secured to the plates 76 are outwardly directed vertically spaced V-shaped bearing members 77 and 78. These bearing members are adapted to slide on the previously described angle members 27 to thereby provide guided movement of the mold support as shown in FIG. 4.

Figure 6:
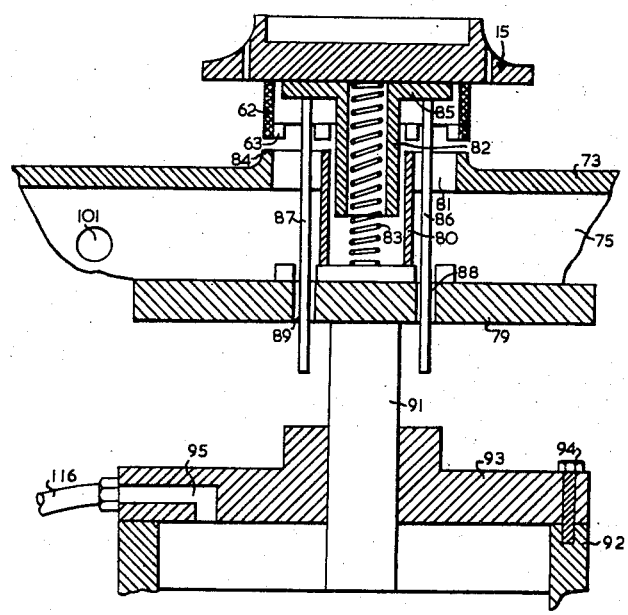
FIG. 6 is a detailed partial sectional view illustrating the lower, movable mold supporting member and attached pneumatic cylinder and also the movable pressure plate.

As shown in FIG. 6 a further plate 79, to which is attached a cylindrical member 80, is secured to the lower edge of the plates 74 and 75 and transverse thereto. The cylindrical member 80 projects upwardly into a central aperture 81 in the plate 73. A further cylindrical member 82 is telescopically mounted within member 80 and confined therein is a compression coil spring 83. The member 82 is secured either permanently or detachably to the lower plate 15 and the compression spring 15 serves to resiliently bias the plate upwardly away from the mold support 12. The plate 15 is identical to that of the upper plate 14 and accordingly, a detailed description of the same is not believed necessary. For a matter of convenience, however, it will be noted that the reinforcing rib 62 includes a plurality of projections 63 adapted to abut against an annular rib 84 formed integrally with plate 73 adjacent the central aperture 81. The member 82 is preferably secured to the plate by an outwardly directed flange 85 formed integrally therewith through which bolts, studs or other suitable securing means may pass. Also attached to this flange 85 is a pair of spaced rods 86 and 87 that project downwardly therefrom through respective apertures 88 and 89 in the plate 79. These rods are adapted to abut against the upper end of a main pneumatic cylinder thereby to eject the tire from the lower mold.

Mold opening and closing mechanism

The toggle arrangements for opening and closing the molds is shown in FIGS. 1, 2, 15 and 16. The opening and closing of the mold is effected by a main pneumatic cylinder 90 that consists of the usual relatively two movable parts, that is, a piston rod 91 and sleeve 92. The piston rod 91 of the cylinder is secured to the plate 79 (FIG. 6) as by welding of other suitable means. The sleeve 92 of the pneumatic cylinder floats freely with respect to the base 18 and is carried by the piston rod 91 to slide axially therealong. The sleeve 92 is closed at the upper end by means of an end plate 93, FIG. 6, through which the shaft 91 passes and such plate may be secured to the sleeve by studs 94 or other suitable means. Included in plate 93 is an aperture 95 to which an air pressure supply hose 116 may be connected.

The movable mold support 12 is connected to the base 18 through two sets of toggle assemblies 96 and 97. Further toggle assemblies may be added if desired, and may be required for tires of large diameter. Each set of toggles consists of an upper spaced pair of first links 98 and 99 pivotally secured by bolts or other suitable means respectively as at 100 to respective plates 74 and 75. The opposite ends of these levers are attached at a first pivot point 102, 103 respectively to a further pair of second links 104 and 105. These latter links are pivotally secured at the opposite ends thereof to the base at pivots 106 and 107. The pivotal securement of such members to the base is by bolts or pins that pass through aligned apertures of the previously described respective pairs of lugs 30 and 31. It will be noted that the lower set of levers 104 and 105 each consist of a pair of space bars interconnected at the ends pivotally joined to the base and are separated at the opposite end to receive therebetween the respective upper members 98 and 99. Secured to the end plate 93 of the cylinder 92 and projecting outwardly therefrom, are pivot pins 108, 109, 110 and 111. These pins may consist of studs threaded into lugs secured to the end plate 93. A third pair of links 112, 113 are pivotally secured at one end thereof to the respective pairs of pins 108, 109 and 110, 111, and at the opposite ends thereof they are pivotally secured to the first links at a second pivot point 114. As will be noted from the drawings these levers are secured respectively to levers 104 and 105. The pivot points of levers 112 and 113 on toggle assemblies 96 and 97 respectively are indicated at 114 and 115 and are located adjacent the pivot points 102 and 103.

The precise arrangement of the pivots are critical in order that the movable mold support 12 travel in a straight path and without binding. Moreover, the relative arrangement of the links, levers and pivots, at least approximately within the ranges given below, is important to obtain the desired mold opening to cylinder movement ratio that is unobtainable from known devices of the prior art. In an actual operative device constructed in accordance with the present invention, the spacing between the various pivot points and shown schematically in FIGS. 15 and 16 is as follows:

| Pivots | Lever | Spacing |
| --- | --- | --- |
| 108 and 111 | | 7 inches center to center. |
| 108 and 114 | 112 | 10 inches center to center. |
| 111 and 115 | 113 | Do. |
| 102 and 106 | 104 | 15 inches center to center. |
| 100 and 102 | 98, 99 | 16 inches center to center. |
| 102 and 114 | | 3¾ inches at 1½ inches off center line of pivots 102 and 106. |
| 100 and 100 | | 25 inches center to center. |
| 106 and 106 | | 36 inches center to center. |

In this same constructed apparatus, the cylinder sleeve 92 has a full travel of 14 inches.

FIGS. 1 and 16 and 2 and 15 respectively represent the mold in an "open" and "closed" position. It will be noted that in each of these positions the sleeve 92 of the main cylinder 90 is in the lowermost position. Said cylinder is not secured to the base 18, but as previously mentioned, is free floating to slide on the piston shaft. In the preferred embodiment, the sleeve 92 of the piston does not contact the base at any time; the fully extended position of the shaft being limited by the piston abutting against the end of the cylinder.

The cylinder 92 is of a double acting type and air pressure may be directed to either the upper or lower end to act on the piston, through respective conduits 116 and 117, FIG. 2. In order to open the mold from the closed position shown in FIG. 2, to the open position shown in FIG. 1 air under pressure is introduced into the upper end of the cylinder 90 through conduit 116. This causes the sleeve 92 to raise vertically and to bring together pivot points 114 and 115. Bringing together such pivot points unlocks the mold and forces the toggles to fold together, and accordingly, the lower mold support 12 gradually lowers until the toggles assume the folded position of FIG. 1. During folding of the toggles, the sleeve 92 of the cylinder gradually raises upwardly from its lowermost position, so that the lower end thereof is considerably above the base and then during further folding of the toggles, the sleeve gradually returns to its lowermost rest position.

When moving the molds from the open position of FIG. 1 to the closed position of FIG. 2, first the piston shaft 91 rises to effectively bring together the plates 14 and 15 with the tire therebetween. As the cycle progresses, the cylinder 92 also rises, swinging levers 104 upwardly and outwardly by means of levers 112, 113 and their pivotal connections 114 and 115. As the piston shaft 91 nears the top of its stroke, fluid is admitted to the lower end of the cylinder drawing it downwardly to the point where the levers 112 and 113 are substantially horizontal as shown in FIG. 2, when the mold is locked in closed position.

The toggle arrangement according to FIG. 17 is substantially the same as that in FIGS. 1 and 2 but the differences in length of the arms 112 as well as the difference in spacing between pivot points 102 and 114 (comparing FIGS. 17 and 15) provide a press opening of over 30 inches with a cylinder stroke of approximately 14¼ inches, a ratio of around 2.12:1.

It will be noted that when the mold is in a closed position, levers 98 and 104 are substantially in alignment but slightly under centre to maintain the necessary pressure on the mold during a curing operation. The force required to keep the toggle members in alignment is very small and is applied by the levers 112 and 113. The reaction of this force is taken by the piston bearing against the end 93 of the main cylinder.

Mold structure

Figure 7:
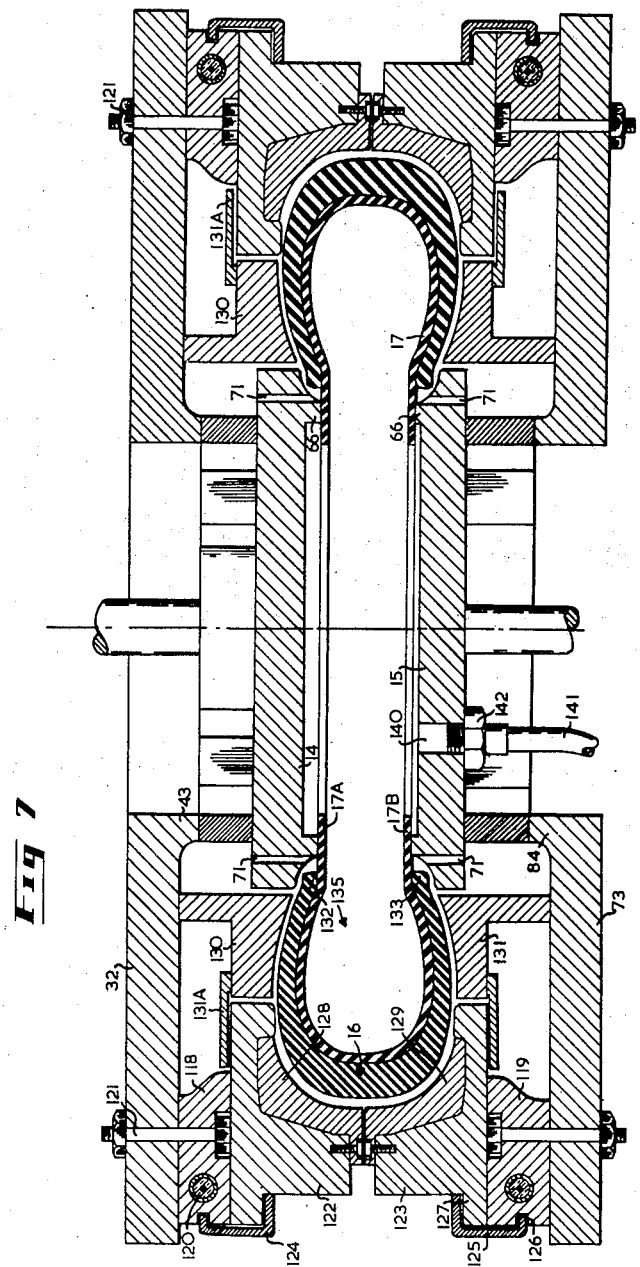
FIG. 7 is a detailed cross sectional view of a two part mold in a "closed" position and employing a novel bladder and pair of plates to provide an air chamber to inflate the tire.

The mold for retreading the tire is shown in detail in FIG. 7. Such mold is of any standard construction, and they are available from several manufacturers. As previously mentioned, the present apparatus has purposely been designed to accommodate existing molds. This has a distinct advantage to people engaged in tire vulcanizing and retreading. The respective upper and lower plates 32 and 73, for purpose of clarity, are not shown (in FIG. 7) attached to their respective supporting members.

Attached to the inwardly directed faces of plates 32 and 73 are respective annular, electrically heated, rings 118 and 119. These rings are of standard construction and each include an electrical resistance heating element 120. The rings are secured to the respective plates by a plurality of bolt and nut assemblies 121.

Identical upper and lower mold sections 122 and 123 respectively are secured to the heating rings 118 and 119 by annular bands 124 and 125. These bands are substantially C shape in cross section, one leg thereof fitting into a circumferential groove 126 in the outer wall of the heating element and the other leg bears against a flange 127 of the respective mold section. Suitable matrices 128 and 129, consisting of a plurality of sections are secured to the mold sections 122 and 123 by studs countersunk in a flange on the outer edge of the matrix. The matrix has imprinted thereon, the desired treads, and it will be onted the matrix covers only a portion of the respective side walls of the tire 16.

The remaining unsupported portion of the wall of the tire is supported by annular spacers 130 and 131 having a portion thereof bearing against the respective plates 32 and 73. The upper plate 130 is retained in position by a plurality of lugs 131A that bear against the upper surface of the mold section 122.

The annular grooves on the plates 14 and 15 receive therein respective beads 132 and 133 of the tire.

Bladder

The bladder 17 is substantially C-shaped in cross section and is made of a flexible impervious relatively tough material. A nonreinforced rubber bladder is found to be satisfactory for this purpose. Other flexible, strong, air impervious materials may also be used. In an alternative form, the liner need not be entirely impervious, but only the portion thereof that overlies the junction between the bead and the plate need be impervious. It is the purpose of the liner to provide a relatively airtight seal between the bead of the tire and the plate. The liner has extended leg portions 17A and 17B so that when the liner is inserted into the tire and conforms to the interior shape thereof, such extended legs project inwardly beyond the beads of the tire and overlies the ribs 66 on the plates 14 and 15. This is clearly seen in FIG. 7.

The position of the plates shown in FIG. 7 is that of the mold being closed and wherein the air chamber between the plates and the interconnecting liner is pressurized. The plates thereby bear against the respective abutments 43 and 84 and are in vertically spaced relation, the beads of the tire fitting into the respective channels in the plates. Prior to this position and upon initially closing the mold sections, the plates 14 and 15 clamp therebetween the inwardly extending leg portions of the bladder. This forms an air chamber 134 between the plates. The adjacent faces of the legs of the bladder are provided with grooves 131 as shown in FIG. 8, and thereby provides means whereby air in chamber 134 may readily enter into an annular chamber 135 formed by the bladder. A further means of facilitating entry of air from chamber 134 to 135 is shown in FIG. 9 wherein the adjacent faces of the legs of the liner are roughened as by beads 136.

Upon pressurization of chambers 134 and 135, the plates are forced apart from one another against the resilient biasing means as shown in FIG. 7.

Prior to pressurizing the chambers, air is trapped between the bladder, the wall 69 of the plate and the bead of the tire, and it is the purpose of the apertures 71 to exhaust this trapped air to atmosphere. It has been found that without exhausting this air, the tire is not always centered within the mold and accordingly, the recapping may result in a dynamically unbalanced tire. Tires that are unbalanced are normally rejected and are not suitable for use.

The lower plate 15 has an aperture 140 to which is attached a flexible conduit 141 by means of a threaded coupling 142. The conduit 141 is connected to a valve assembly indicated generally at 143. The valve assembly is connected to an air pressure supply through conduit 144. The control of air to and from the chamber 134 will be described in more detail hereinafter.

As previously mentioned, the plates 14 and 15 will accommodate only one tire size. In order to accommodate various sized tires, it is necessary to have a separate pair of plates for each size of tire.

FIG. 10 illustrates a modified plate whereby such plate may be readily changed. Only one plate is shown, however, it is to be understood that a pair of such plates is required. In this figure, plate 150 includes an annular rib 151 and a circumferential channel 152 along with discharge apertures 153. The rear face of the plate is recessed as at 154 to thereby receive a plate 155 that is secured to the shaft 156 of a pneumatic cylinder.

The plate 150 is secured to member 155 by a plurality of studs 157. One of such studs 158 may have a central aperture 159 to which a conduit 160 may be connected to thereby supply air under pressure into the chamber defined between a pair of such plates.

FIG. 10 also illustrates a modified air release means comprising a circumferential groove 161 located in the tire bead receiving channel 152.

A plurality of further grooves 162, transverse to groove 161 may also be included in the channel 152. The air discharge apertures 153 terminate in the groove 161 and are thereby in communication therewith.

FIG. 11 illustrates a further modification to the present invention, which modification includes a plurality of apertures 170 which extend from the edge 171 of the annular rib to the opposite faces of the respective plates. These apertures are adapted to be connected to the negative pressure supply to thereby provide a vacuum which facilitates airtight engagement between the face 171 of the plate and the outer face of the leg of the bladder 173.

Operation and control system

In recapping a tire with a device constructed in accordance with the present invention, the apparatus initially assumes the position of that shown in FIG. 1. This has been termed the mold "open" position. The bladder 17 is manually inserted into the tire and the assembled tire and liner are placed upon the lower mold. The legs of the liner, project beyond the bead of the tire, to bear against the rib on the lower plate 15. Air is then introduced under pressure into the upper end of the cylinder 90 and the lower mold support member 12 moves towards the upper mold support 11 to thereby close the mold. Such movement is effected by the previously described lever arrangement and the mold is locked in a closed position as shown in FIG. 2, as previously described. Air under pressure, controlled by valve assembly 143 is introduced into the chambers 134 and 135 to a pressure of approximately 175 p.s.i. The desired temperatures and pressures selected are all standard procedure in vulcanizing. With the present invention, pressures are somewhat greater than standard. These greater pressures appear desirable, and due to the construction of the present device, safety has not been adversely affected. At the conclusion of vulcanization, the pressure, through control valve assembly 143 is reduced to that of atmospheric pressure or thereabouts. The mold is then opened by the lever mechanism. Simultaneously, as the mold is open, air pressure is supplied to the upper air cylinder 38 to thereby eject the tire from the upper mold. As the lower mold support 12 assumes the lowermost position, the pair of rods 86 and 87 abut against the collar 93A of the main cylinder and thereby raises the plate 15. As the plate 16 raises, the tire is ejected from the lower part of the mold.

The various operations of the apparatus are controlled automatically by a clock timer mechanism 200 located on the cross head member as shown in FIG. 1.

Referring now to the schematic electrical diagram, shown in FIG. 12, the electrical control system consists of a timer mechanism 200, a limit switch 201 consisting of a pair of mechanically interconnected switches, a pressure responsive switch 202 and an electromagnetically operated air valve assembly 143 consisting of electromagnets 203, 204 and 205 which in turn control respective air valves 206, 207 and 208.

The timer switch 200 consists of any standard unit having a pair of normally open contacts 209 and a pair of normally closed contacts 210. Initial setting of the dial 211 of the timer closes contacts 209 and opens the normally closed contacts 210. The electrical supply 212 through lead 213, switch 209, lead 214, contact 215 and lead 216 is directed to the electromagnet 203 to thereby open air valve 206. Valve 206 controls the air supply to the bottom of the main cylinder 90 by conduit 117 to thereby close the mold. Upon closing of the mold, a rod 220, bar 230 that interconnects the limit switches abuts a stop 231 to thereby mechanically change limit switch 201 from the position of that shown in FIG. 12 in solid line, to that shown in dotted line. The rod 220 carries a pair of spaced adjustable positioned blocks 232 adapted to abut opposite sides of the stop member 231. In the latter position of the limit switch, contacts 221 and 222 are closed. Current is thus directed to the electromagnet 204, through the lead 223 to thereby open air valve 207. Air valve 207 controls the air supply to the chamber defined between the pressure plates, and accordingly, upon opening the valve, such chamber becomes pressurized. Contacts 220 of the limit switch are closed, however, on initial setting of the timer, contacts 210 are opened. Electromagnet 205 is thereby not actuated, whereby air valve 208 remains closed. The air valve 208 controls the air pressure supply to the upper end of the cylinder 90 to open the mold and also controls the upper cylinder 58 thereby to actuate the latter. After a predetermined time has elapsed, contact switch 209 of the timer opens automatically, and contacts 210 close. Electricity from source 212 through lead 213 contacts 210, contacts 222, which thereby normally actuate electromagnet 205. Pressure responsive switch 202 however, is connected to and responsive to the air pressure in chamber 134. When the chamber is pressurized, the switch is held in an open position. Open switch 202 prevents energization of electromagnet 205 and air valve 208 accordingly, remains closed, until such time as the pressure in chamber 134 returns to that of approximately atmospheric pressure. At this time, pressure switch 202 closes, whereby electromagnet 205 is actuated and air valve 208 is opened to thereby actuate the cylinder 90 to open the mold. The cycle of operation for retreading is thus complete.

Valve

A section of the air valve assembly 143 is shown in detail in FIG. 13 illustrating valve 206. Each of the valves 205, 207 and 208 are identical and consist of inserts 250 and 251 threaded respectively into oppositely directed, axially aligned aperture 252 and 253 in a block of material. The block may be steel, plastic or any other suitable material. The apertures 252 and 253 are in communication through a central bore 254 of reduced diameter to thereby present respective shoulders 255 and 256 to form valve seats. Each insert 250 and 251 has a cylindrical recess 257 adapted to receive therein a longitudinally slidable piston 258. Each piston has a stem 259 extending outwardly therefrom adapted to abut one another. The upper piston 258 has a further stem 259A axially aligned with stem 259 but directed outwardly from the other side of the piston. The stem 259A projects beyond the valve block and is adapted to be struck by the plunger, hammer or the like movable element of an electromagnet. The inserts further include enlarged recesses 260 adapted to receive therein a resilient valve seat 261. The valve seats 261 in the respective members bear against the shoulders 255 and 256 and the pistons 258 abut against the opposite face to thereby form a seal. The lower piston 258 is resiliently biased upwardly by a coil spring 261 and is thereby held in a closed position. This is further assisted by the air pressure in supply conduit 144.

The insert 251 includes a circumferential groove 262 in communication by way of a plurality of apertures 263 and 264 with the central recess 257. It will be noted the apertures 263 terminate within the bore adjacent the resilient material 261 while the apertures 264 terminate adjacent the opposite end of the bore. The groove 262 is in communication with a bore 265 that is connected by way of the conduit 144 to a suitable air pressure supply.

The stem of the lower piston 258 abuts against the stem projecting downwardly from the upper piston thereby holding the latter valve in an open position. Upon actuation of the electromagnet the upper piston 250 is physically moved downwardly thereby opening the lower valve and closing the upper valve the latter of which discharges to atmosphere through apertures 267 and 268 located respectively in the insert 250 and the valve body. These apertures are in communication by virtue of an annular groove 269 in the insert 250. This groove effectively forms a manifold around the outside of the insert. The central bore 254 is in communication with a further bore 280 in the body of the valve, such bore being in communication with the conduit 117 that is connected to the bottom of the main cylinder 90. Actuation of electromagnet 203 thereby opens the valve to permit air under pressure in conduit 144 to be in communication with conduit 117.

The valve 207 has one outlet that is connected, by way of conduit 141, to the lower plate 15 to thereby deliver air into the central chamber defined between such plates when closed. The valve 208 has an outlet similar to 280 in valve 206 and it is connected by way of conduits 116 and 60 respectively to the top of the main cylinder 90 and to the cylinder 58. The valve body has a central manifold 290 interconnecting valves 206, 207 and 208 to thereby form a common supply to each of the valves. Valves 207 and 208 are identical to valve 206 described above. Each valve thereby controls the air required air pressure supply and discharge.

I claim:

1. Apparatus for treating pneumatic tires comprising a frame having a base portion; an upper mold fixed to said frame and a lower mold slidably arranged in the frame for reciprocating movement toward and away from the upper mold to provide closed and open positions respectively for said molds; means for reciprocating said lower mold including a fluid cylinder prime mover and at least a pair of toggle units connecting the cylinder and the lower mold; each toggle unit of said pair comprising (a) a first pair of links each pivotally connected at one end to the base portion of said frames;
   (b) a second pair of links each pivotally connected at one end to the movable lower mold;
   (c) said first and second pairs of links being pivotally connected, at their other ends, to each other at a first pivot point;
   (d) and a third link pivotally connected at one end to said cylinder and at its other end to the pair of first links at a second pivot point spaced from but adjacent to said first pivot point, whereby, raising and lowering of said cylinder effects folding of said toggle units to reciprocate said lower mold;
   (e) the lengths of said links and the spacing of said first and second pivot points being such that the mold to cylinder movement ratio is in excess of 1.00:1.

2. Aparatus accordinng to claim 1 including a pair of plates, one concentrically mounted on each said mold, said plates being adapted to contact the opposite bead portions of a tire placed in said apparatus, the tire together with said plates defining a pressurizable chamber; and a bladder for insertion in the tire and having portions adapted to overlie the junction of the beads of the tire and the plates to provide a relatively airtight joint therebetween whereby inflation of said bladder effects inflation of the tire within the molds.

3. An apparatus as defined in claim 2 wherein said plates are co-planar and relatively movable with respect to one another.

4. An apparatus as defined in claim 2 wherein said plates each have an annular channel adjacent the edge thereof adapted to receive therein the respective beads of said tire.

5. An apparatus as defined in claim 2 wherein said plates are supported upon respective mold supports and are relatively movable with respect thereto and resiliently biased outwardly from the respective mold support toward the opposite mold support.

6. A device as defined in claim 2 including means urging said plates inwardly at selected positions of the mold sections, comprising a pneumatic cylinder secured to one support and its associated plate and abutment means secured to the other of said plates to abut a member on the frame of said device at a position of the plates associated supporting member.

7. An apparatus as defined in claim 2 including air releasing means comprising a further annular groove in said annular channel, said further groove being associated with a discharge aperture in the respective plate.

8. An apparatus as defined in claim 5 including a plurality of circumferentially spaced grooves transverse to and communicating with said further groove.

9. In a tire treating apparatus having a frame with upper and lower mold halves therein with the lower mold half being movable away from the upper half to open the mold and toward the upper half to close the mold and a reciprocating cylinder to effect said lower mold movement; the improvement comprising at least a pair of toggle units interconnecting the cylinder and the lower mold half for transmitting movement of said cylinder to said lower mold half; each toggle unit of each pair comprising (a) a first pair of links each pivotally connected at one end to the lower part of said frame;
   (b) a second pair of links each pivotally connected at one end to one side of the lower mold half;
   (c) said first and second links being connected together at their other ends at a first pivot point;
   (d) and a third link pivotally connected at one end to said cylinder and at its other end to the pair of first links at a second pivot point spaced from but adjacent to said first pivot point whereby reciprocation of said cylinder effects folding of said toggle units about the pivotal connections of said links to raise or lower the lower mold half with respect to the upper mold half;

(e) the lengths of said links and the spacing of the first and second pivot points being such that the mold to cylinder movement ratio is in excess of 2.00:1.

10. Apparatus according to claim 1 wherein the cylinder has a travel of approximately 14 inches; the lengths of said first, second and third links are approximately 15, 16 and 10 inches respectively; the spacing between said first and second pivot points in approximately 3.75 inches; and the lower mold opens approximately 15⅛ inches.

11. Apparatus according to claim 9 wherein the cylinder has a travel of approximately 14.25 inches; the lengths of said first, second and third links are approximately 18, 15 and 6 inches respectively; the spacing between the first and second pivot points is approximately 3.75 inches, and the lower mold half opens approximately 30.25 inches.

References Cited

UNITED STATES PATENTS

| | | | |
|---|---|---|---|
| 2,135,299 | 11/1938 | Benander | 18—16 T |
| 2,624,915 | 1/1953 | Corson | 18—16 T |
| 2,792,592 | 5/1957 | McGee | 18—16 T |
| 2,835,921 | 5/1958 | White | 18—18 F |
| 2,989,779 | 6/1961 | White | 18—18 F |

J. HOWARD FLINT, Jr., Primary Examiner

U.S. Cl. X.R.

425—168, 36, 30